United States Patent
Oshiba

(10) Patent No.: US 9,059,914 B2
(45) Date of Patent: Jun. 16, 2015

(54) USABLE BANDWIDTH MEASUREMENT METHOD, USABLE BANDWIDTH MEASUREMENT SYSTEM, TERMINAL DEVICE, AND COMPUTER-READABLE RECORDING MEDIUM

(75) Inventor: Takashi Oshiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 467 days.

(21) Appl. No.: 13/515,133

(22) PCT Filed: Dec. 9, 2010

(86) PCT No.: PCT/JP2010/072173
§ 371 (c)(1),
(2), (4) Date: Aug. 7, 2012

(87) PCT Pub. No.: WO2011/071127
PCT Pub. Date: Jun. 16, 2011

(65) Prior Publication Data
US 2012/0307661 A1    Dec. 6, 2012

(30) Foreign Application Priority Data

Dec. 11, 2009 (JP) .................................. 2009-281291

(51) Int. Cl.
H04L 12/26    (2006.01)

(52) U.S. Cl.
CPC ......... *H04L 43/0882* (2013.01); *H04L 43/0876* (2013.01); *H04L 43/10* (2013.01)

(58) Field of Classification Search
CPC .................................................. H04L 43/0882
USPC ......... 370/389, 236, 252, 238, 256, 336, 216, 370/468
See application file for complete search history.

(56) References Cited

U.S. PATENT DOCUMENTS

| 6,614,763 | B1 * | 9/2003 | Kikuchi et al. ............... 370/252 |
| 6,754,221 | B1 * | 6/2004 | Whitcher et al. ............. 370/401 |
| 6,961,319 | B2 * | 11/2005 | Novaes .......................... 370/256 |
| 7,366,199 | B1 * | 4/2008 | Vaughan et al. .............. 370/468 |

(Continued)

FOREIGN PATENT DOCUMENTS

| JP | 2005-269460 A | 9/2005 |
| JP | 4153510 B2 | 9/2008 |

(Continued)

OTHER PUBLICATIONS

Vinay J. Ribeiro, et al., "pathChirp: Efficient Available Bandwidth Estimation for Network Paths", in Proc of Passive and Active Measurement Workshop, 2003, pp. 1-11.

(Continued)

*Primary Examiner* — Andrew Lai
*Assistant Examiner* — Andrew C Lee
(74) *Attorney, Agent, or Firm* — Sughrue Mion, PLLC

(57) ABSTRACT

An order of terminal devices that are destinations of a measurement packet train to be transmitted is instructed to each of a plurality of terminal devices connected together via a network (step S101). The measurement packet train is transmitted from each of the plurality of terminal devices to a destination terminal device in accordance with the instructed order (step S102). An available bandwidth in a path from an originator of the measurement packet train to the destination is calculated based on a receiving status of the measurement packet train at the destination terminal device (step S103).

12 Claims, 8 Drawing Sheets

(56) References Cited

U.S. PATENT DOCUMENTS

| | | | |
|---|---|---|---|
| 7,436,772 B2 * | 10/2008 | Padhye et al. | 370/235 |
| 7,443,804 B2 * | 10/2008 | Cheung et al. | 370/252 |
| 7,539,211 B2 * | 5/2009 | Oh et al. | 370/468 |
| 7,558,202 B2 * | 7/2009 | Luo et al. | 370/232 |
| 7,616,585 B1 * | 11/2009 | Kritov et al. | 370/252 |
| 7,961,635 B2 * | 6/2011 | Werner et al. | 370/248 |
| 2002/0133614 A1 * | 9/2002 | Weerahandi et al. | 709/237 |
| 2002/0194361 A1 * | 12/2002 | Itoh et al. | 709/233 |
| 2004/0243335 A1 * | 12/2004 | Gunawardena et al. | 702/116 |
| 2005/0021621 A1 * | 1/2005 | Welch et al. | 709/204 |
| 2005/0207349 A1 | 9/2005 | Nagami et al. | |
| 2006/0002425 A1 * | 1/2006 | Mane et al. | 370/477 |
| 2006/0045023 A1 * | 3/2006 | Kim et al. | 370/252 |
| 2006/0155873 A1 * | 7/2006 | Twata et al. | 709/240 |
| 2006/0187942 A1 * | 8/2006 | Mizutani et al. | 370/401 |
| 2006/0230189 A1 * | 10/2006 | Sahara et al. | 710/8 |
| 2006/0280123 A1 * | 12/2006 | Ozaki | 370/235 |
| 2007/0115804 A1 * | 5/2007 | Hibino | 370/216 |
| 2008/0130515 A1 * | 6/2008 | Vasseur | 370/254 |
| 2009/0122716 A1 * | 5/2009 | Hayashi | 370/252 |
| 2009/0248871 A1 * | 10/2009 | Takase et al. | 709/226 |

FOREIGN PATENT DOCUMENTS

| | | |
|---|---|---|
| JP | 2008-258877 A | 10/2008 |
| JP | 2009-071684 A | 4/2009 |
| JP | 2009-206845 A | 9/2009 |

OTHER PUBLICATIONS

Communication dated Dec. 2, 2014 from the Japanese Patent Office in counterpart application No. 2011-545250.

* cited by examiner

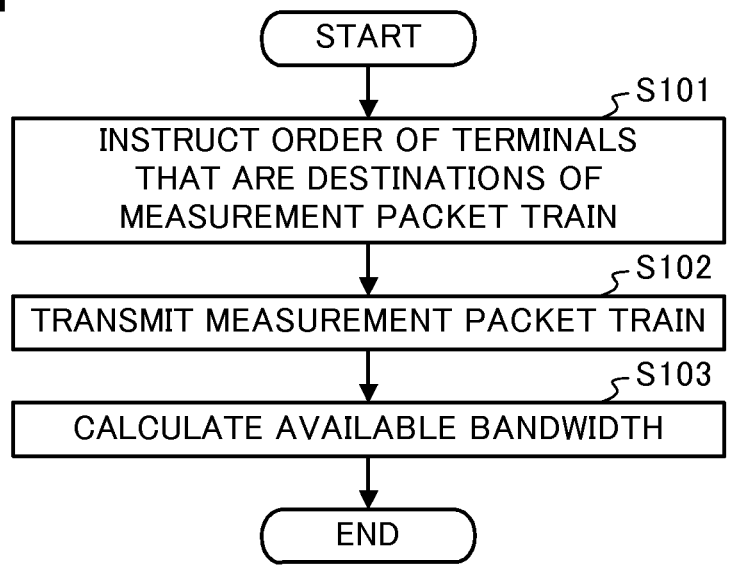
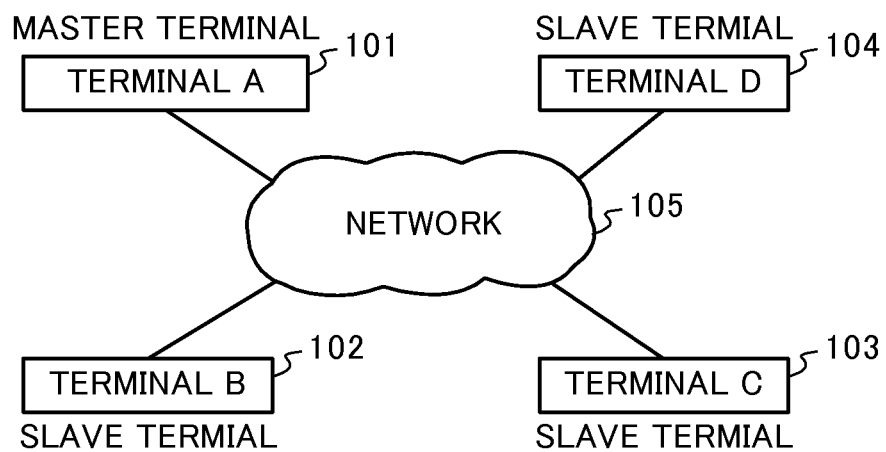

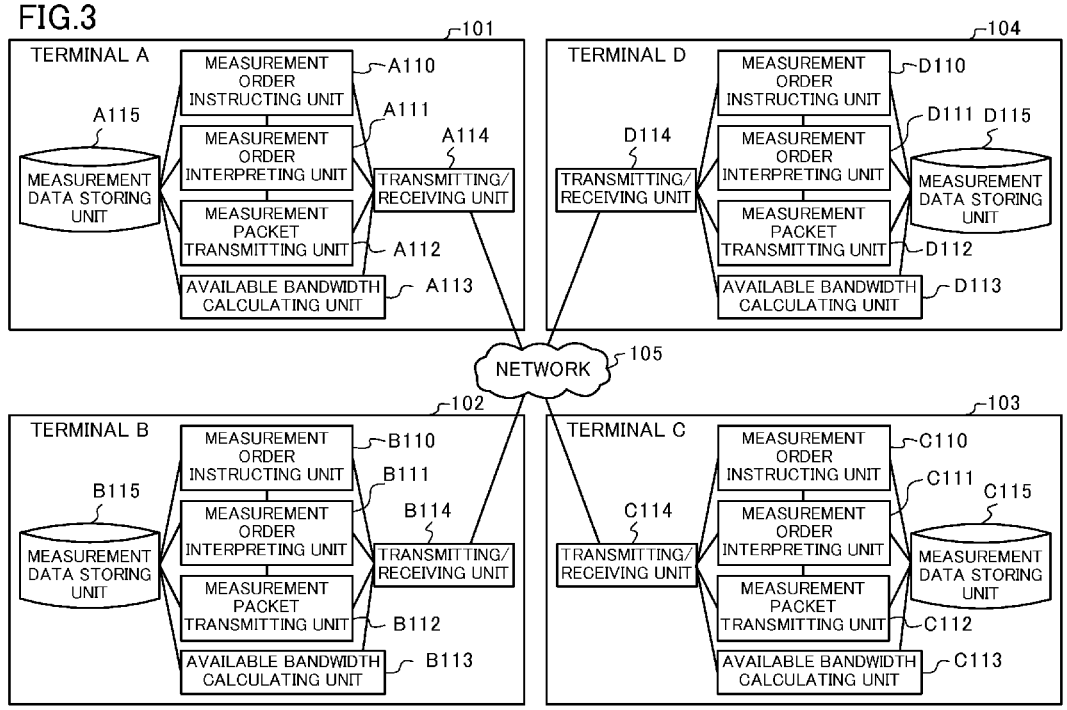

USABLE BANDWIDTH MEASUREMENT METHOD, USABLE BANDWIDTH MEASUREMENT SYSTEM, TERMINAL DEVICE, AND COMPUTER-READABLE RECORDING MEDIUM

TECHNICAL FIELD

The present invention relates to technologies for measuring an available bandwidth in a communication pathway over a network.

BACKGROUND ART

In general, a bandwidth available in an IP network (hereinafter, referred to as an available bandwidth) is an unused bandwidth subtracting the other traffic (hereinafter, referred to as cross traffic) flowing over the IP network from the physical bandwidth of an IP network. For example, when the physical bandwidth is 100 Mbps and the cross traffic is 30 Mbps, the available bandwidth is 100 Mbps−30 Mbps=70 Mbps.

Various proposals for a measuring technology of an available bandwidth has been made in the past. For example, Non-Patent Literature 1 discloses a technique of transmitting the train of plural measurement packets in a fixed size as a collection from a transmitter terminal to a receiver terminal, and causing the receiver terminal to detect a change in the receiving interval of each measurement packet, thereby measuring an available bandwidth. According to this technology, when the measurement packet train is transmitted from the transmitter terminal, the transmitting interval for each measurement packet is reduced exponentially. This exponentially increases the transmission rate for the measurement packet in the measurement packet train.

When the measurement packet passes through the network, if there is a packet of cross traffic positioned between the two measurement packets, the transmission rate for the measurement packet may exceed the available bandwidth of the network. When the transmission rate for the measurement packet exceeds the available bandwidth, the receiving interval for the measurement packet at the receiver terminal increases relative to the transmitting interval at the transmitter terminal. The technology disclosed in Non-Patent Literature 1 utilizes this characteristic, detects a point where the receiving interval for the measurement packet at the receiver terminal starts to increase in comparison with the transmitting interval at the transmitter terminal, and divides the packet size of the measurement packet by the transmitting interval at that point, thereby measuring the available bandwidth.

Moreover, Patent Literature 1 discloses a technology of causing the transmitter terminal to repeatedly transmit in plural times the measurement packet train which has a fixed size and has an equal transmitting interval to the receiver terminal, thereby searching the available bandwidth. According to the technology of Patent Literature 1, when it is determined at the receiver terminal that the receiving interval tends to increase, the transmitter terminal transmits the measurement packet train having the transmitting interval exponentially decreased to the receiver terminal. On the other hand, when it is determined at the receiver terminal that the receiving interval tends to decrease, the transmitter terminal transmits the measurement packet train having the transmitting interval exponentially increased to the receiver terminal. According to the technology of Patent Literature 1, such operations are repeated in order to perform binary searching, thereby searching the available bandwidth.

PRIOR ART LITERATURE

Patent Literature

Patent Literature 1: Japan Patent No. 4153510

Non-Patent Literature

Non-Patent Literature 1: Vinay J. Ribeiro, Rudolf H. Riedi, Richard G. Baraniuk, Jiri Navratil and Les Cottrell, "pathChirp: Efficient Available Bandwidth Estimation for Network Paths," in Proc of Passive and Active Measurement Workshop 2003.

DISCLOSURE OF INVENTION

Problems to be Solved by the Invention

In the meanwhile, in recent IP networks, full-duplex communication is popular, and even if the communication pathway is the same, it is normal that the available bandwidth differs depending on the direction of the communication. When, for example, a terminal A and a terminal B communicate, the available bandwidth in the direction from the terminal A to the terminal B is 50 Mbps, and the available bandwidth in the direction from the terminal B to the terminal A is 60 Mbps in some cases.

Regarding this point, according to the technologies of Patent Literature 1 and the Non-Patent Literature 1, only measurement of the available bandwidth in the one-way direction from a terminal to another terminal is in consideration. Hence, according to the above-explained conventional technologies, it is difficult to precisely measure within a short time the bidirectional available bandwidth for each communication pathway between a plurality of terminals connected in a full mesh manner.

The above technical issue will be explained with reference to an example case in which four terminals A to D are connected in a full mesh manner and the terminal A attempts to obtain all measurement results. In this case, the total number of the communication pathways between respective terminals is six. Hence, when a bidirectional situation is considered, the measurement-target pathways for available bandwidths are 6×2=12 pathways as a whole. In this case, there are two techniques for measuring the bidirectional available bandwidth for each communication pathway through the technologies of Patent Literature 1 and Non-Patent Literature 1: a technique of measuring the available bandwidth in each direction in each communication pathway one by one serially; and a technique of measuring available bandwidths in each direction in respective communication pathways simultaneously and in a parallel manner.

FIG. 10 shows an example case in which the bidirectional available bandwidth in each communication pathway is measured one by one serially. First, the terminal A transmits in step 401 a measurement packet train to the terminal B. The terminal B calculates in step 402 an available bandwidth from the receiving status of the transmitted measurement packet train from the terminal A, and transmits the calculation result, i.e., the measurement result of the available bandwidth to the terminal A. Accordingly, the terminal A can obtain the available bandwidth in the direction from the terminal A to the terminal B.

When receiving the measurement result from the terminal B, the terminal A instructs the terminal B to transmit a measurement packet train to the terminal C. The terminal B transmits in step 403 the measurement packet train to the terminal C in response to the instruction from the terminal A. The terminal C calculates in step 404 an available bandwidth from the receiving status of the measurement packet train transmitted from the terminal B, and transmits the calculation result (the measurement result) to the terminal A. Accordingly, the terminal A can obtain the available bandwidth of the communication pathway from the terminal B to the terminal C. Moreover, when receiving the measurement result from the terminal C, the terminal A instructs the terminal C to transmit a measurement packet train to the terminal D.

Since then, each terminal transmits a measurement packet train to another terminal in response to the instruction from the terminal A, and measures an available bandwidth from the receiving status of the measurement packet train transmitted from another terminal, and transmits the measurement result to the terminal A (steps 405 to 422). In this manner, the terminal A can obtain bidirectional available bandwidths for all communication pathways.

FIG. 11 shows an example case in which a bidirectional available bandwidth in each communication pathway is measured simultaneously and in a parallel manner. The terminal A instructs respective terminals B to D to simultaneously transmit a measurement packet train to all terminals connected to each terminal (step 451). The terminals A to D simultaneously transmit the measurement packet train to all terminals connected to respective terminals (step 452). Each of the terminals A to D calculates an available bandwidth of each communication pathway based on the receiving status of the measurement packet train received from another terminal. Next, the terminals B to D transmit the measurement results of the available bandwidths for respective communication pathways to the terminal A (step 453).

In the above-explained case, when the available bandwidth is measured one by one serially, a large number of steps are necessary until the terminal A obtains bidirectional available bandwidths for all communication pathways. Hence, measurement of the available bandwidth within a short time is difficult. Conversely, when available bandwidths are measured simultaneously in a parallel manner, the number of steps is few, and the measurement of the available bandwidths can complete within a short time. When, however, a terminal simultaneously transmits the measurement packet train to the plurality of terminals, or the plurality of terminals simultaneously transmit the measurement packet train to a terminal, the plurality of measurement packet trains collide and interfere with one another, and thus the interval between respective measurement packets configuring the measurement packet train may expand.

For example, in the case of FIG. 11, when taking a particular note of the terminal A, in the step 452, when the measurement packet train simultaneously transmitted from the terminal A to the terminals B to D simultaneously passes through a network cable directly connected to the terminal A, an interference occurs. Moreover, the three measurement packet trains simultaneously transmitted from the terminals B to D to the terminal A simultaneously flow in the network cable directly connected to the terminal A, and thus an interference occurs. As a result, even if the network is not crowded with traffic in reality, the expansion of the receiving interval of the measurement packet is observed at the receiver terminal, and the smaller available bandwidth is falsely calculated, resulting in the possibility of an imprecise measurement.

According to bidirectional communication systems, it is important to measure a bidirectional available bandwidth precisely for each of the plurality of communication pathways. In particular, in the case of a system in which a plurality of terminals are connected in a full mesh manner over an IP network to carry out a bidirectional communication in real time like an IP telephone conference, it is necessary to precisely measure a bidirectional available bandwidth within a short time. If a bidirectional available bandwidth can be precisely measured within a short time for each communication pathway between the plurality of terminals, for example, if a bandwidth consumed by a sound and a video picture has an already known fixed value, it becomes possible to precisely calculate how many number of terminals at maximum can participate an IP telephone conference or an IP television conference within a short time.

However, as explained above, there is a trade-off relation between a measurement of the available bandwidth within a short time and a precise measurement.

The present invention has been made in view of the above-explained circumstances, and it is an object of the present invention to provide an available bandwidth measuring method and the like, which can precisely measure a bidirectional available bandwidth between a plurality of terminals within a short time.

Means for Solving the Problems

A first aspect of the present invention provides an available bandwidth measuring method that includes: a step of instructing an order of terminal devices where a measurement packet train is transmitted to each of a plurality of terminal devices connected together via a network; a step of transmitting the measurement packet train to the terminal device that is a destination of the measurement packet train from each of the plurality of terminal devices in accordance with the order; and a step of calculating an available bandwidth in a path from an originator of the measurement packet train to the destination based on a receiving status of the measurement packet train at the destination terminal device.

A second aspect of the present invention provides an available bandwidth measuring system including a master terminal device and a plurality of slave terminal devices connected together via a network, in which the master terminal device includes: a measurement order instructing means for notifying the slave terminal devices of measurement order information that indicates an order of terminal devices each of which is a destination of a measurement packet train to be transmitted; a first measurement order interpreting means for interpreting the order of transmitting the measurement packet train to the destination terminal device based on the measurement order information set for the master terminal device; a first measurement packet transmitting means for transmitting the measurement packet train to the destination terminal device in accordance with the order interpreted by the first measurement order interpreting means; and a first available bandwidth calculating means for calculating, using the measurement packet train received from another terminal device, an available bandwidth in a path from the another terminal device to the master terminal device, each slave terminal device includes: a second measurement order interpreting means for interpreting the order of transmitting the measurement packet train from the slave terminal device to the destination terminal device based on the measurement order information notified from the master terminal device, second measurement packet transmitting means for transmitting the measurement packet train to the destination terminal device in accordance with the order interpreted by the second measurement order interpreting means, and a second available bandwidth calculating means for calculating, using the measurement packet train received from an other terminal device, an available bandwidth in a path from the other terminal device to the slave terminal device.

A third aspect of the present invention provides a terminal device that includes: a measurement order instructing means for notifying another terminal device connected together via a network of measurement order information indicating an order of terminal devices that are destinations of a measurement packet train to be transmitted; a measurement order interpreting means for interpreting the order of transmitting the measurement packet train to the destination terminal device based on the measurement order information set for the terminal device; a measurement packet transmitting means for transmitting the measurement packet train to the destination terminal device in accordance with the order interpreted by the measurement order interpreting means; and an available bandwidth calculating means for calculating, using the measurement packet train received from an other terminal device, an available bandwidth in a path from the other terminal device to the terminal device.

A fourth aspect of the present invention provides a terminal device that includes: a measurement order interpreting means for receiving measurement order information indicating an order of terminal devices that are destinations of a measurement packet train to be transmitted, and interpreting the order of transmitting the measurement packet train to the destination terminal device from the terminal device based on the received measurement order information; a measurement packet transmitting means for transmitting the measurement packet train to the destination terminal device in accordance with the order interpreted by the measurement order interpreting means; and an available bandwidth calculating means for calculating, using the measurement packet train received from another terminal device, an available bandwidth in a path from the another terminal device to the terminal device.

A fifth aspect of the present invention provides a computer-readable recording medium storing therein a program that allows a computer to execute: a process of notifying another terminal device connected together via a network of measurement order information indicating an order of terminal devices that are destinations of a measurement packet train to be transmitted; a process of interpreting the order of transmitting the measurement packet train to the destination terminal device based on the measurement order information set for a local terminal device; a process of transmitting the measurement packet train to the destination terminal device in accordance with the interpreted order; and a process of calculating, using the measurement packet train received from an other terminal device, an available bandwidth in a path from the other terminal device to the local terminal device.

A sixth aspect of the present invention provides a computer-readable recording medium storing therein a program that allows a computer to execute: a process of receiving measurement order information indicating an order of terminal devices that are destinations of a measurement packet train to be transmitted, and interpreting the order of transmitting the measurement packet train to the destination terminal device from a local terminal device based on the received measurement order; a process of transmitting the measurement packet train to the destination terminal device in accordance with the interpreted order; and a process of calculating, using the measurement packet train received from another terminal device, an available bandwidth in a path from the another terminal device to the local terminal device.

Effect of the Invention

According to the present invention, it becomes possible to precisely measure a bidirectional available bandwidth between a plurality of terminals within a short time.

BRIEF DESCRIPTION OF DRAWINGS

FIG. 1 is a flowchart for explaining the outline of an available bandwidth measurement method according to the present invention;

FIG. 2 is a diagram showing a whole configuration of an available bandwidth measurement system according to an embodiment of the present invention;

FIG. 3 is a block diagram showing a functional configuration of each terminal configuring the available bandwidth measurement system shown in FIG. 2;

MODE FOR CARRYING OUT THE INVENTION

Figure 4:
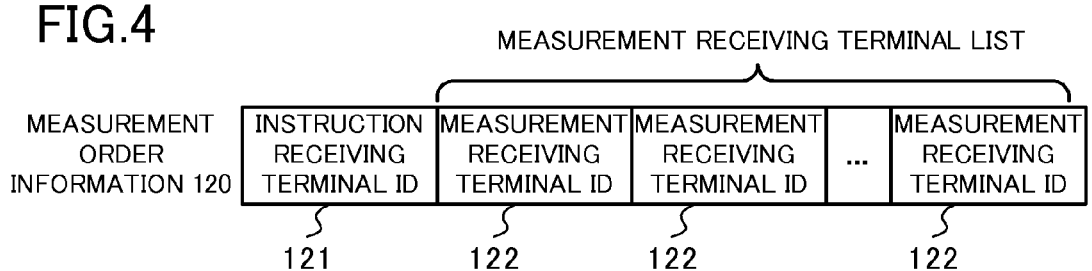
FIG. 4 is a diagram showing a structure of measurement order information.

Prior to the explanation for an embodiment of the present invention, the outline of the present invention will be explained. FIG. 1 is a flowchart showing an outline of an available bandwidth measurement method according to the present invention. According to the method of the present invention, first, each of a plurality of terminals connected to one another via a network is instructed with an order of a transmission destination terminal where a measurement packet train should be transmitted (step S101). Next, each of the plurality of terminals transmits a measurement packet train to the transmission destination terminal in accordance with the instructed order (step S102). Subsequently, an available bandwidth in a communication pathway from the originator of the measurement packet train to the destination is calculated based on the receiving status of the measurement packet train at the destination terminal (step S103).

Hereinafter, an embodiment of the present invention will be explained with reference to the accompanying drawings.

FIG. 2 is a diagram showing a configuration of an available bandwidth measurement system according to an embodiment of the present invention. As shown in FIG. 2, the available bandwidth measurement system includes a master terminal (a terminal A101), and a plurality of slave terminals (a terminal B102, a terminal C103, and a terminal D104), and those terminals are connected one another via a network 105. Unillustrated terminals other than the terminal A101, the terminal B102, the terminal C103, and the terminal D104 may be connected to the network 105, and a cross traffic may flow between those unillustrated terminals.

The terminal A101 that serves as a master terminal instructs a transmitting order of a measurement packet train for measuring an available bandwidth to each slave terminal (the terminal B102, the terminal C103, and the terminal D104), and collects the available bandwidth measured by each slave terminal. Each slave terminal transmits the measurement packet train to respective terminals (the master terminals and all slave terminals other than itself) in accordance with the order instructed by the master terminal. Moreover, each slave terminal transmits a measurement result of an available bandwidth in a communication pathway with another terminal to the master terminal. According to this embodiment, the number of slave terminals is three, but equal to or greater than four slave terminals may be connected.

An example of each of the terminal A101, the terminal B102, the terminal C103, and the terminal D104 is a personal computer, a portable information terminal, a cellular phone, a smart phone, a fixed-line phone, a street multimedia terminal, an in-vehicle terminal, a television with a network-connection function, a set top box with a network-connection function, a gaming machine, a printer with a network-connection function, or a scanner with a network-connection function or the like. Alternatively, the terminal A101, the terminal B102, the terminal C103, and the terminal D104 may be other kinds of similar devices which have a function of exchanging information with the exterior.

FIG. 3 is a block diagram showing a functional configuration of each terminal. The terminal A101 includes a measurement order instructing unit A110, a measurement order interpreting unit A111, a measurement packet transmitting unit A112, an available bandwidth calculating unit A113, a transmitting/receiving unit A114, and a measurement data storing unit A115. The terminal B102 includes a measurement order instructing unit B110, a measurement order interpreting unit B111, a measurement packet transmitting unit B112, an available bandwidth calculating unit B113, a transmitting/receiving unit B114, and a measurement data storing unit B115. The terminal C103 includes a measurement order instructing unit C110, a measurement order interpreting unit C111, a measurement packet transmitting unit C112, an available bandwidth calculating unit C113, a transmitting/receiving unit C114, and a measurement data storing unit C115. The terminal D104 includes a measurement order instructing unit D110, a measurement order interpreting unit D111, a measurement packet transmitting unit D112, an available bandwidth calculating unit D113, a transmitting/receiving unit D114, and a measurement data storing unit D115.

The measurement order instructing unit A110 instructs the order of destination terminals where the measurement packet train should be transmitted to respective slave terminals (the terminal B102, the terminal C103, and the terminal D104). More specifically, the measurement order instructing unit A110 transmits measurement order information containing the list of measurement receiving terminals set with the transmission order of the measurement packet train to respective slave terminals, thereby notifying the respective slave terminals of the order of the terminals that are the destinations of the measurement packet train. Moreover, the measurement order instructing unit A110 supplies the measurement order information for the local terminal (i.e., the terminal A101) to the measurement order interpreting unit A111. The detail of the measurement order information will be explained later.

The measurement order interpreting unit A111 (first measurement order interpreting means) analyzes the measurement order information supplied from the measurement order instructing unit A110, and interprets the order that the terminal A101 transmits the measurement packet train to the other terminals.

The measurement packet transmitting unit A112 (first measurement packet transmitting means) transmits the measurement packet train to the other terminals. Example measurement packets available are an IP (Internet Protocol) packet, a UDP (User Dataram Protocol) packet, an RTP (Real-time Transport Protocol) packet, a TCP (Transmission Control Protocol) packet and/or the like. The measurement packet may be the packet of the other protocols than those protocols.

The available bandwidth calculating unit A113 (first available bandwidth calculating means) calculates an available bandwidth of a communication pathway with another terminal using the measurement packet train received from another terminal. For calculation of the available bandwidth, for example, techniques disclosed in Non-Patent Literature 1 and Patent Literature 1 are available. The calculation technique of an available bandwidth is not limited to any particular one, and various conventionally well-known techniques can be applied.

The transmitting/receiving unit A114, for example, transmits the measurement order information, transmits/receives the measurement packet train, and receives information (measurement result information) on the measurement result of the available bandwidth. The measurement data storing unit A115 stores the measurement order information and the measurement result information.

The functions of respective units of the terminal B102, the terminal C103, and the terminal D104 are the same as those of respective units of the terminal A101 except some functions. It is fine if the terminal A101 that is the master terminal has the measurement order instructing unit (measurement order instructing means), and thus the terminal B102, the terminal C103, and the terminal D104 that are the slave terminals do not need to have respective measurement order instructing unit B110, measurement order instructing unit C110, and measurement order instructing unit D110.

In the terminal B102, the terminal C103, and the terminal D104, the measurement order interpreting unit B111, the measurement order interpreting unit C111, and the measurement order interpreting unit D111 each analyzes the measurement order information received from the terminal A101, and interprets the order that the local terminal transmits the measurement packet train to another terminal.

FIG. 4 is a diagram showing a structure of measurement order information 120. As shown in FIG. 4, the measurement order information 120 contains an instruction receiving terminal ID 121, and a measurement receiving terminal list. The instruction receiving terminal ID 121 indicates an identifier of a terminal transmitting the measurement packet train in accordance with the measurement order information 120. The measurement receiving terminal list contains the identifier (a measurement receiving terminal ID 122) of a target terminal (a measurement receiving terminal) where the measurement packet train should be transmitted. In other words, the measurement receiving terminal list contains respective IDs of the terminals other than the local terminal among the plurality of terminals connected to the network.

The sequence of the measurement receiving terminal IDs 122 in the measurement receiving terminal list corresponds to the transmission order of the measurement packet train, i.e., the order of the terminal measuring the available bandwidth in the communication pathway with the terminal (the terminal indicated by the instruction receiving terminal ID). For example, the measurement receiving terminal ID 122 stored in the i-th (where i is a natural number equal to or smaller than, when the number of terminals connected to the network is N, N−1) of the measurement receiving terminal list indicates an ID of the terminal receiving the measurement packet train in the i-th order to measure the available bandwidth. Examples of the measurement receiving terminal ID 122 available are an IP address of a terminal, a MAC address, an SIP address, a telephone number, and a host name.

Figure 5:
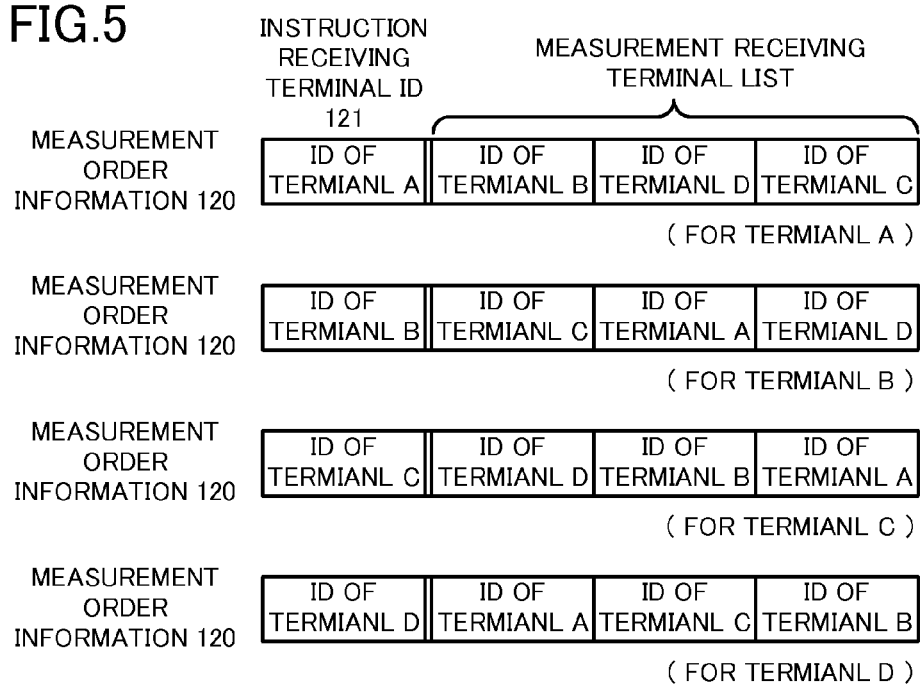
FIG. 5 is a diagram showing the contents of measurement order information corresponding to each of terminals A to D.

FIG. 5 is a diagram showing four pieces of measurement order information 120 corresponding to the terminal A101, the terminal B102, the terminal C103, and the terminal D104, respectively. The measurement data storing unit A115 of the terminal A101 that is the master terminal stores four pieces of measurement order information 120 corresponding to the terminal A101, the terminal B102, the terminal C103, and the terminal D104. That is, the measurement data storing unit A115 stores four pieces of measurement order information 120: the measurement order information 120 for the terminal A101 having the instruction receiving terminal ID 121 that is the ID of the terminal A101; the measurement order information 120 for the terminal B102 having the instruction receiving terminal ID 121 that is the ID of the terminal B102; the measurement order information 120 for the terminal C103 having the instruction receiving terminal ID 121 that is the ID of the terminal C103; and the measurement order information 120 for the terminal D104 having the instruction receiving terminal ID 121 that is the ID of the terminal D104.

The measurement receiving terminal lists of the four pieces of measurement order information 120 each contains three measurement receiving terminal IDs 122. That is, in each measurement order information 120, the measurement receiving terminal ID 122 contains the IDs of the terminals other than the terminal specified by the instruction receiving terminal ID 121 among the four terminals (the terminal A101, the terminal B102, the terminal C103, and the terminal D104) connected to the network 105.

The sequence of the measurement receiving terminal IDs 122 in the measurement receiving terminal list in each measurement order information 120 is set in such a way that the plurality of terminals do not transmit the measurement packet train to a terminal simultaneously, i.e., at the same timing, and in other words, a terminal does not receive the measurement packet trains simultaneously (at the same timing) from the plurality of terminals.

According to this embodiment, as shown in FIG. 5, the sequence of the measurement receiving terminal IDs 122 in the measurement order information 120 for the terminal A101 is in the order of the ID of the terminal B102, the ID of the terminal D104, and the ID of the terminal C103. The sequence of the measurement receiving terminal IDs 122 in the measurement order information 120 for the terminal B102 is in the order of the ID of the terminal C103, the ID of the terminal A101, and the ID of the terminal D104. Moreover, the sequence of the measurement receiving terminal IDs 122 in the measurement order information 120 for the terminal C103 is in the order of the ID of the terminal D104, the ID of the terminal B102, and the ID of the terminal A101. Furthermore, the sequence of the measurement receiving terminal IDs 122 in the measurement order information 120 for the terminal D104 is in the order of the ID of the terminal A101, the ID of the terminal C103, and the ID of the terminal B102.

By setting the measurement receiving terminal list in the measurement order information 120 corresponding to each terminal in this fashion, the plurality of terminals do not transmit the measurement packet trains to a terminal simultaneously (at the same timing).

Figure 6:
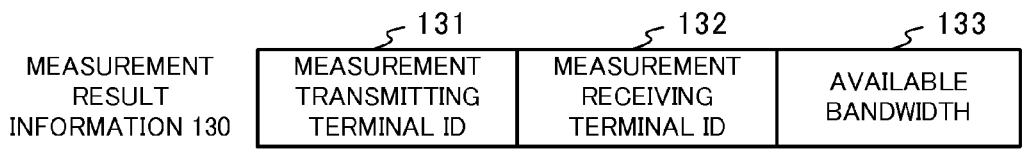
FIG. 6 is a diagram showing a structure of measurement result information.

FIG. 6 is a diagram showing a structure of measurement result information 130. The measurement result information 130 contains a measurement transmitting terminal ID 131, a measurement receiving terminal ID 132, and an available bandwidth 133. The measurement transmitting terminal ID 131 indicates the identifier of the terminal transmitting the measurement packet train. The measurement receiving terminal ID 132 indicates a terminal that is the destination of the measurement packet train, i.e., the identifier of the terminal that has received the measurement packet train. The available bandwidth 133 indicates a measurement result of the available bandwidth in a direction from the terminal identified by the measurement transmitting terminal ID 131 to the terminal identified by the measurement receiving terminal ID 132.

Figure 7:
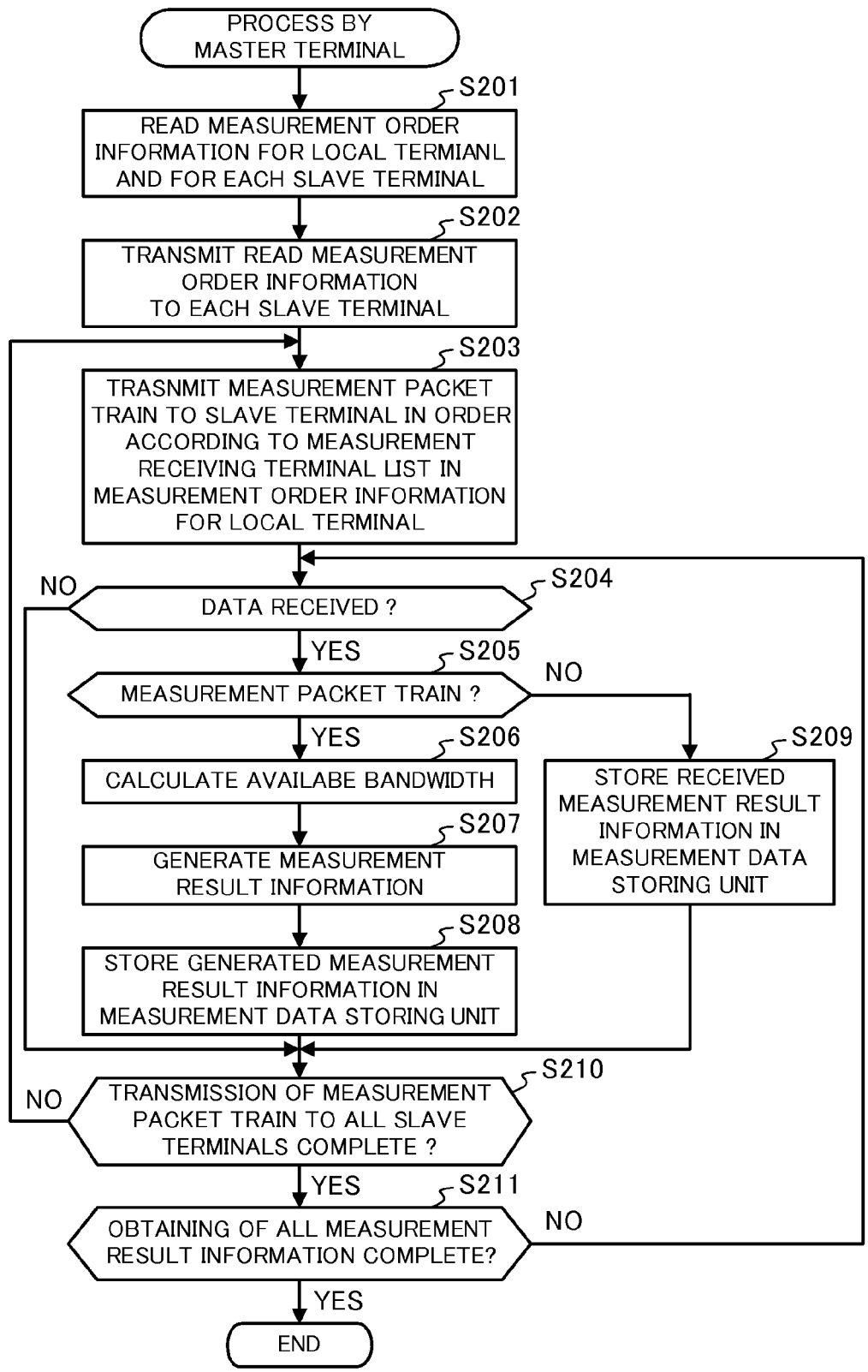
FIG. 7 is a flowchart showing a process procedure by a master terminal.

FIG. 7 is a flowchart showing a procedure of a process (an available bandwidth collecting process) executed by the master terminal (the terminal A101) to obtain the available bandwidth in each communication pathway in the available bandwidth measuring system of this embodiment. The available bandwidth collecting process is executed in accordance with a program stored in a predetermined memory in advance and for the available bandwidth collecting process. When a user gives a predetermined operation through an unillustrated operation input unit of the master terminal, this program is activated, and the available bandwidth collecting process starts. The activation timing of this program is optional, and for example, such a program may be automatically activated at a predetermined time interval.

First, the measurement order instructing unit A110 of the terminal A101 reads the pieces of measurement order information 120 (see FIG. 4 and FIG. 5) for the local terminal and for respective slave terminals from the measurement data storing unit A115 (step S201). That is, the measurement order instructing unit A110 reads the measurement order information 120 storing, as the instruction receiving terminal ID 121, respective IDs of the terminal A101, the terminal B102, the terminal C103, and the terminal D104 from the measurement data storing unit A115.

The measurement order instructing unit A110 transmits the pieces of read measurement order information 120 for respective slave terminals to the terminal B102, the terminal C103, the terminal D104 through the transmitting/receiving unit 114 (step S202). Moreover, the measurement order instructing unit A110 supplies the read measurement order information 120 for the local terminal to the measurement order interpreting unit A111. A specification may be applied to the measurement order instructing unit A110 so as to dynamically generate the measurement order information 120 for each slave terminal in accordance with the number of the slave terminals connected to the network 105.

When transmission of the measurement order information 120 to each slave terminal completes, the measurement order interpreting unit A111 extracts the measurement receiving terminal list from the measurement order information 120 supplied from the measurement order instructing unit A110. The measurement order interpreting unit A111 sequentially picks up the measurement receiving terminal ID 122 from the head of the extracted measurement receiving terminal list, and supplies the picked-up ID to the measurement packet transmitting unit A112. At this time, the measurement order interpreting unit A111 updates the contents of the measurement order information 120 so that the picked-up measurement receiving terminal ID 122 from the measurement order information 120 is recognizable. For example, the most significant bit of the picked-up measurement receiving terminal ID 122 contained in the measurement order information 120 is changed (to one).

The measurement packet transmitting unit A112 transmits the measurement packet train to the terminal specified by the supplied measurement receiving terminal ID 122 (step S203).

When the transmitting/receiving unit A114 receives data from another terminal (step S204: YES), the transmitting/receiving unit A114 supplies this data to the available bandwidth calculating unit A113. The available bandwidth calculating unit A113 determines the kind of the supplied data (step S205). As a result, when this data is the measurement packet train (step S205: YES), the available bandwidth calculating unit A113 calculates the available bandwidth using the supplied measurement packet train (step S206). The available bandwidth calculating unit A113 generates measurement result information 130 (see FIG. 6) based on the calculation result (the measurement result) (step S207). In this case, the measurement result information 130 contains the measurement transmitting terminal ID 131 that is the ID of the terminal that is the originator of the measurement packet train, the measurement receiving terminal ID 132 that is the ID of the local terminal (i.e., the terminal A101), and the available bandwidth 133 that is the calculation result of the available bandwidth.

Next, the available bandwidth calculating unit A113 stores the generated measurement result information 130 in the measurement data storing unit A115 (step S208).

Conversely, when the received data is not the measurement packet train, i.e., is the measurement result information 130 (step S205: NO), the available bandwidth calculating unit A113 stores the measurement result information 130 in the measurement data storing unit A115 (step S209).

When the transmitting/receiving unit A114 does not receive data from another terminal (step S204: NO), the process by the terminal A101 transitions to step S210.

In the step S210, the measurement order interpreting unit A111 determines whether or not transmission of the measurement packet train to all terminals specified by the measurement receiving terminal list completes (step S210). As a result, when transmission of the measurement packet train to all terminals does not complete yet (step S210: NO), the measurement order interpreting unit A111 supplies the next measurement receiving terminal ID 122 contained in the measurement receiving terminal list to the measurement packet transmitting unit A112. Next, the measurement packet transmitting unit A112 transmits the measurement packet train to the terminal specified by the supplied measurement receiving terminal ID 122 (step S203).

Conversely, when transmission of the measurement packet train to all terminals completes (step S210: YES), the available bandwidth calculating unit A113 determines whether or not all pieces of measurement result information 130 are obtained, i.e., whether or not bidirectional available bandwidths for all terminals are obtained (step S211). As a result, when all pieces of measurement result information 130 are not obtained (step S211: NO), the process by the terminal A101 transitions to the step S204. Conversely, when all pieces of measurement result information 130 are obtained (step S211: YES), the terminal A101 terminates this process (the available bandwidth collecting process).

Figure 8:
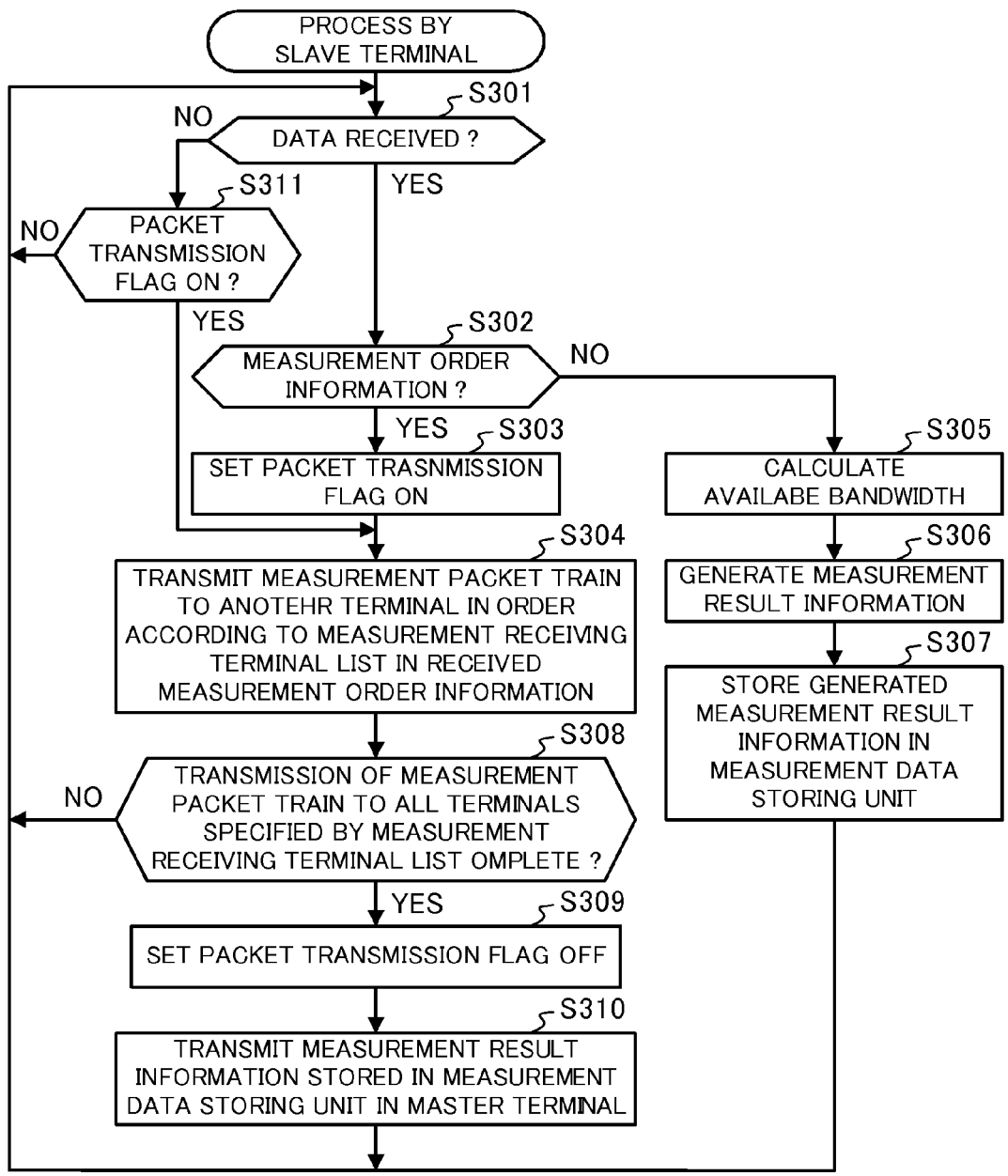
FIG. 8 is a flowchart showing a process procedure by a slave terminal.

Next, with reference to the flowchart of FIG. 8, an explanation will be given of the operation of each slave terminal (the terminal B102, the terminal C103, and the terminal D104) during the execution of the available bandwidth collecting process. This operation is common to respective terminals, and in the following explanation, when each structural unit is referred, for example, a denotation like the transmitting/receiving unit B114, etc., will be given.

At each slave terminal, when powered on, the program for this process stored in the predetermined memory in advance is activated. The process below shown by the flowchart is repeatedly executed in accordance with this program.

When the transmitting/receiving unit B114, etc., receives data from another terminal (step S301:YES), the transmitting/receiving unit B114, etc., determines the kind of the received data (step S302).

As a result, when the data is the measurement order information 120 (step S302: YES), the transmitting/receiving unit B114, etc., supplies the measurement order information 120 to the measurement order interpreting unit B111, etc., and sets a packet transmission flag to be ON (step S303). The packet transmission flag is a variable set to be ON until transmission of the measurement packet train to all terminals specified in the measurement receiving terminal list in the measurement order information 120 completes after the measurement order information 120 is received from the master terminal. The packet transmission flag is expanded in a memory like an unillustrated RAM (Random Access Memory), etc., of the local terminal after the above-explained program is activated, and managed over the memory.

The measurement order interpreting unit B111, etc., (second measurement order interpreting means) extracts the measurement receiving terminal list from the measurement order information 120 supplied from the transmitting/receiving unit B114, etc. The measurement order interpreting unit B111, etc., sequentially picks up the measurement receiving terminal ID 122 from the head of the extracted measurement receiving terminal list, and supplies the picked-up ID to the measurement packet transmitting unit B112, etc. At this time, the measurement order interpreting unit B111, etc., updates the contents of the measurement order information 120 so that the measurement receiving terminal ID 122 picked up from the measurement order information 120 is recognizable. For example, the most significant bit of the picked-up measurement receiving terminal ID 122 contained in the measurement order information 120 is changed (to one).

The measurement packet transmitting unit B112, etc., (second measurement packet transmitting means) transmits the measurement packet train to the terminal specified by the supplied measurement receiving terminal ID 122 (step S304).

Conversely, when the data is not the measurement order information 120, i.e., when the data is the measurement packet train (step S302: NO), the transmitting/receiving unit B114, etc., supplies the measurement packet train to the available bandwidth calculating unit B113, etc.

The available bandwidth calculating unit B113, etc., (second available bandwidth calculating means) calculates the available bandwidth using the supplied measurement packet train (step S305). The available bandwidth calculating unit B113, etc., generates the measurement result information 130 (see FIG. 6) based on the calculation result (the measurement result) (step S306). In this case, the measurement result information 130 contains the measurement transmitting terminal ID 131 that is the ID of the terminal of the originator of the measurement packet train, the measurement receiving terminal ID 132 that is the ID of the terminal (i.e., the local terminal), and the available bandwidth 133 that is the calculation result of the available bandwidth.

The available bandwidth calculating unit B113, etc., stores the generated measurement result information 130 in the measurement data storing unit B115, etc., (step S307). Thereafter, the process by the slave terminal returns to the step S301.

After the process by the step S304, the measurement order interpreting unit B111, etc., determines whether or not transmission of the measurement packet train to all terminals specified by the measurement receiving terminal list completes (step S308). As a result, when transmission of the measurement packet train to all terminals does not complete yet (step S308: NO), the process by the slave terminal returns to the step S301. Conversely, when transmission of the measurement packet train to all terminal completes (step S308: YES), the measurement order interpreting unit B111, etc., sets the packet transmission flag to be OFF (step S309).

The available bandwidth calculating unit B113, etc., transmits the measurement result information 130 stored in the measurement data storing unit B115, etc., to the master terminal (the terminal A101) through the transmitting/receiving unit B114, etc., (step S310). Next, the process by the slave terminal returns to the step S301. The available bandwidth calculating unit B113, etc., may transmit the measurement result information 130 one by one to the master terminal, or may transmit those pieces of information as a collection of data to the master terminal.

When the transmitting/receiving unit B114, etc., does not receive the data from another terminal (step S301: NO), the transmitting/receiving unit B114, etc., determines whether or not the packet transmission flag is ON (step S311). When the packet transmission flag is ON (step S311: YES), the process by the slave terminals transitions to the step S304. At this time, in the step S304, the measurement order interpreting unit B111, etc., supplies the next measurement receiving terminal ID 122 contained in the measurement receiving terminal list to the measurement packet transmitting unit B112, etc. Next, the measurement packet transmitting unit B112, etc., transmits the measurement packet train to the terminal specified by the supplied measurement receiving terminal ID 122. Conversely, when the packet transmission flag is OFF (step S311: NO), the process by the slave terminal returns to the step S301.

As explained above, by the process (the available bandwidth collecting process) of the master terminal and the process by each slave terminal, the master terminal (the terminal A101) can obtain bidirectional available bandwidths in all communication pathways.

Figure 10:
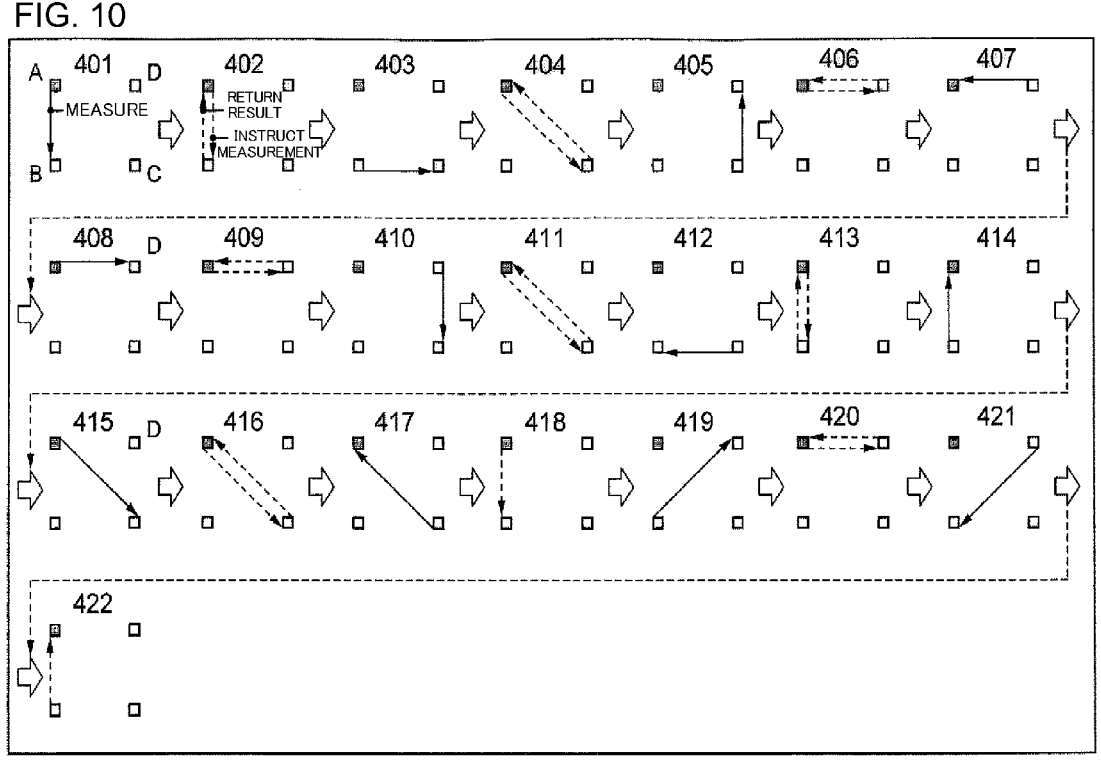
FIG. 10 is a diagram for explaining a technique of measuring a bidirectional available bandwidth in each communication pathway one by one and serially.

According to the present invention, while a terminal (for example, the terminal B102) is transmitting the measurement packet train to another terminal in the order specified by the measurement receiving terminal list in the measurement order information 120 for the local terminal, another terminal ((for example, the terminal C103) is capable of transmitting the measurement packet train to the other terminal in the order specified by the measurement receiving terminal list in the measurement order information 120 for the local terminal. Hence, in comparison with the technique of measurement the available bandwidth one by one serially (see FIG. 10), measurement of the available bandwidth can be carried out within a short time.

Figure 11:
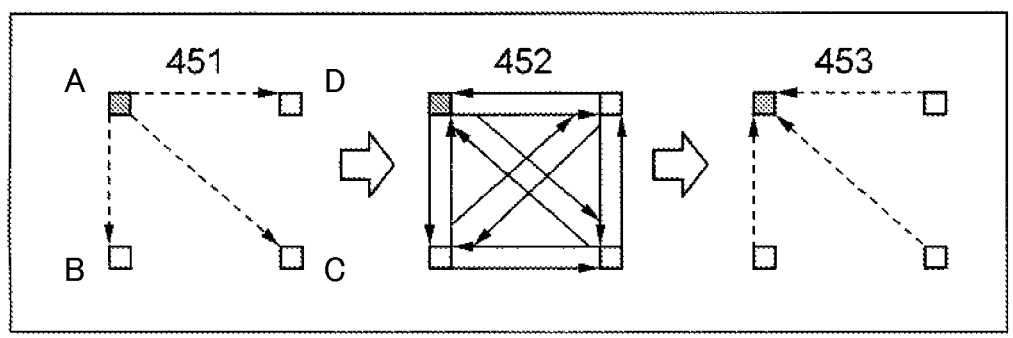
FIG. 11 is a diagram for explaining a technique of measuring a bidirectional available bandwidth in each communication pathway simultaneously and in a parallel manner.

Moreover, according to the present invention, since the measurement packet is transmitted to another terminal in the predetermined order, in comparison with a technique of causing each terminal to transmit the measurement packet train to all of the other terminals simultaneously in a parallel manner (see FIG. 11), calculation of the available bandwidth can be carried out precisely. That is, the present invention can make the trade-off relation between a measurement within a short time and a precise measurement balanced.

In particular, according to the available bandwidth measuring system of this embodiment, each terminal transmits the measurement packet train to each terminal by each terminal in series in accordance with the measurement order set in advance, and does not transmit the measurement packet train to the plurality of terminals simultaneously (at the same timing). Moreover, the measurement order of respective terminals is set in such a way that the plurality of terminals do not transmit the measurement packet trains to a terminal simultaneously (at the same timing), i.e., a terminal does not receive the measurement packet trains from the plurality of terminals simultaneously. Since each terminal transmits the measurement packet train to another terminal in accordance with the measurement order set in this manner, even if respective terminals transmit the measurement packet trains simultaneously in a parallel manner, equal to or greater than two measurement packet trains do not collide and interfere with each other at each terminal. Hence, according to the available bandwidth measuring system of this embodiment, a bidirectional available bandwidth can be precisely measured within a short time for each communication pathway among the plurality of terminals connected in a full mesh manner.

Moreover, according to the available bandwidth measuring system of this embodiment, each slave terminal transmits the measurement result of the calculated available bandwidth to the master terminal. According to this scheme, all measurement results can be concentrated to a terminal in the plurality of terminals.

According to the above-explained factors, the available bandwidth measuring system of this embodiment can be applied to a system which connects the plurality of terminals in a full mesh manner to carry out an IP telephone conference or an IP television conference. According to this embodiment, since a bidirectional available bandwidth can be precisely measured within a short time, if the bandwidth consumed by a sound or a video picture has a conventionally known fixed value, when an IP telephone conference or an IP television conference is to start, it is possible to precisely calculate how many number of terminals can participate the IP telephone conference or the IP television conference at maximum within a short time.

Figure 9:
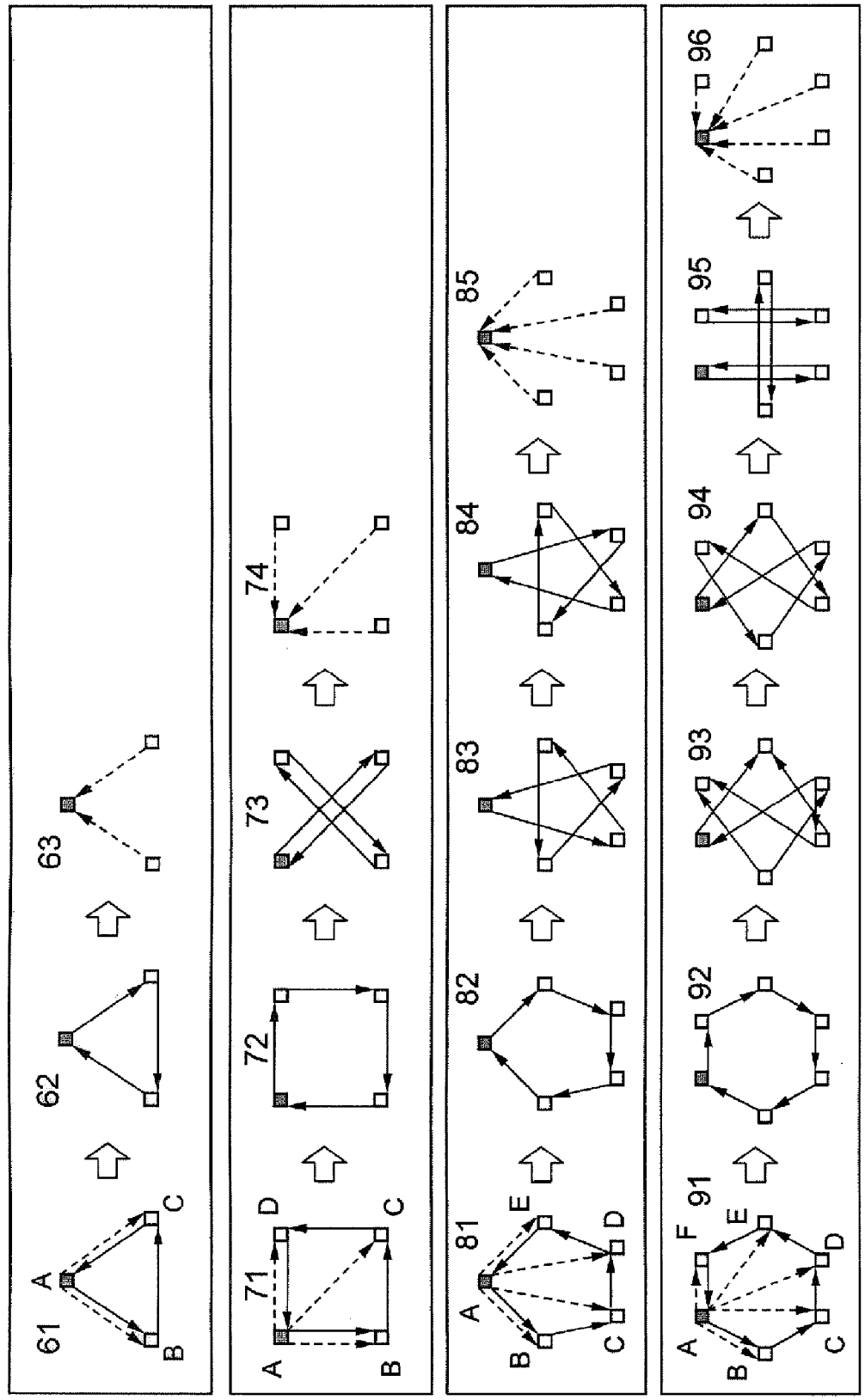
FIG. 9 is a diagram showing how a measurement packet train is transmitted/received and a measurement result is transmitted/received when the number of terminals is three to six.

According to the above-explained embodiment, the explanation was given of the case in which the number of terminals is four, but the number of the terminals is optional. FIG. 9 shows how a measurement packet train is transmitted/received and a measurement result is transmitted/received when the number of terminals is three to six. When the number of terminals is three, the terminal A instructs the measurement order to the terminal B and the terminal C. Moreover, the terminal A transmits the measurement packet train to the terminal B in accordance with the measurement order. The terminal B transmits the measurement packet train to the terminal C in accordance with the measurement order instructed by the terminal A. The terminal C transmits the measurement packet train to the terminal A in accordance with the measurement order instructed by the terminal A (step 61). Each of the terminal A to the terminal C calculates the available bandwidth using the received measurement packet train.

Next, the terminal A transmits the measurement packet train to the terminal C, the terminal B transmits the measurement packet train to the terminal A, and the terminal C transmits the measurement packet train to the terminal B (step 62). The terminals A to C each calculates an available bandwidth using the received measurement packet train. Finally, the terminal B and the terminal C respectively transmit the measurement results of available bandwidths calculated by the local terminals to the terminal A (step 63). As explained above, even if the number of terminals is three, the terminal A can gain the bidirectional available bandwidth for each communication pathway between respective terminals.

When the number of terminals is four, the terminal A instructs the measurement order to the terminal B to the terminal D. Moreover, in accordance with the measurement order, first, the terminal A transmits the measurement packet train to the terminal B that is the first terminal. The terminal B transmits the measurement packet train to the terminal C. The terminal C transmits the measurement packet train to the terminal D, and the terminal D transmits the measurement packet train to the terminal A (step 71). Each of the terminal A to the terminal D calculates the available bandwidth using the received measurement packet train.

The terminal A transmits the measurement packet train to the terminal D that is the second terminal specified in the measurement order. The terminal B transmits the measurement packet train to the terminal A. The terminal C transmits the measurement packet train to the terminal B, and the terminal D transmits the measurement packet train to the terminal C (step 72). Each of the terminal A to the terminal D calculates the available bandwidth using the received measurement packet train.

The terminal A transmits the measurement packet train to the terminal C that is the third terminal specified in the measurement order. The terminal B transmits the measurement packet train to the terminal D. The terminal C transmits the measurement packet train to the terminal A, and the terminal D transmits the measurement packet train to the terminal B (step 73). Each of the terminal A to the terminal D calculates the available bandwidth using the received measurement packet train. Finally, the terminal B to the terminal D respectively transmit the measurement results of the available bandwidths calculated by the local terminals to the terminal A (step 74). In this manner, even if the number of terminals is four, the terminal A can gain the bidirectional available bandwidth for each communication pathway between respective terminals.

When the number of terminals is five, the terminal A instructs the measurement order to the terminal B to a terminal E. The terminal A transmits the measurement packet train to the terminal B that is the first terminal in accordance with the measurement order. The terminal B transmits the measurement packet train to the terminal C, the terminal C transmits the measurement packet train to the terminal D, the terminal D transmits the measurement packet train to the terminal E, and the terminal E transmits the measurement packet train to the terminal A (step 81). Each of the terminal A to the terminal E calculates the available bandwidth using the received measurement packet train.

The terminal A transmits the measurement packet train to the terminal E that is the second terminal specified in the measurement order. The terminal B transmits the measurement packet train to the terminal A, the terminal C transmits the measurement packet train to the terminal B, the terminal D transmits the measurement packet train to the terminal C, and the terminal E transmits the measurement packet train to the terminal D (step 82). Each of the terminal A to the terminal E calculates the available bandwidth using the received measurement packet train.

The terminal A transmits the measurement packet train to the terminal C that is the third terminal specified in the measurement order. The terminal B transmits the measurement packet train to the terminal D, the terminal C transmits the measurement packet train to the terminal E, the terminal D transmits the measurement packet train to the terminal A, and the terminal E transmits the measurement packet train to the terminal B (step 83). Each of the terminal A to the terminal E calculates the available bandwidth using the received measurement packet train.

The terminal A transmits the measurement packet train to the terminal D that is the fourth terminal specified in the measurement order. The terminal B transmits the measurement packet train to the terminal E, the terminal C transmits the measurement packet train to the terminal A, the terminal D transmits the measurement packet train to the terminal B, and the terminal E transmits the measurement packet train to the terminal C (step 84). Each of the terminal A to the terminal E calculates the available bandwidth using the received measurement packet train. Finally, the terminal B to the terminal E respectively transmit the measurement results of the available bandwidths calculated by the local terminals to the terminal A (step 85). In this manner, even if the number of terminals is five, the terminal A can gain the bidirectional available bandwidth for each communication pathway between respective terminals.

When the number of terminals is six, the terminal A instructs the measurement order to the terminal B to a terminal F. First, the terminal A transmits the measurement packet train to the terminal B that is the first terminal in accordance with the measurement order. The terminal B transmits the measurement packet train to the terminal C, the terminal C transmits the measurement packet train to the terminal D, the terminal D transmits the measurement packet train to the terminal E, the terminal E transmits the measurement packet train to the terminal F, and the terminal F transmits the measurement packet train to the terminal A (step 91). Each of the terminal A to the terminal F calculates the available bandwidth using the received measurement packet train.

The terminal A transmits the measurement packet train to the terminal F that is the second terminal specified in the measurement order. The terminal B transmits the measurement packet train to the terminal A, the terminal C transmits the measurement packet train to the terminal B, the terminal D transmits the measurement packet train to the terminal C, the terminal E transmits the measurement packet train to the terminal D, and the terminal F transmits the measurement packet train to the terminal E (step 92). Each of the terminal A to the terminal F calculates the available bandwidth using the received measurement packet train.

The terminal A transmits the measurement packet train to the terminal D that is the third terminal specified in the measurement order. The terminal B transmits the measurement packet train to the terminal F, the terminal C transmits the measurement packet train to the terminal E, the terminal D transmits the measurement packet train to the terminal B, the terminal E transmits the measurement packet train to the terminal A, and the terminal F transmits the measurement packet train to the terminal C (step 93). Each of the terminals A to F calculates the available bandwidth using the received measurement packet train.

The terminal A transmits the measurement packet train to the terminal E that is the fourth terminal specified in the measurement order. The terminal B transmits the measurement packet train to the terminal D, the terminal C transmits the measurement packet train to the terminal F, the terminal D transmits the measurement packet train to the terminal A, the terminal E transmits the measurement packet train to the terminal C, and the terminal F transmits the measurement packet train to the terminal B (step 94). Each of the terminal A to the terminal F calculates the available bandwidth using the received measurement packet train.

The terminal A transmits the measurement packet train to the terminal C that is the fifth terminal specified in the measurement order. The terminal B transmits the measurement packet train to the terminal E, the terminal C transmits the measurement packet train to the terminal A, the terminal D transmits the measurement packet train to the terminal F, the terminal E transmits the measurement packet train to the terminal B, and the terminal F transmits the measurement packet train to the terminal D (step 95). Each of the terminal A to the terminal F calculates the available bandwidth using the received measurement packet train.

Finally, the terminal B to the terminal F respectively transmit the measurement results of the available bandwidths calculated by the local terminals to the terminal A (step 96). In this manner, even if the number of terminals is six, the terminal A can gain the bidirectional available bandwidth for each communication pathway between respective terminals. When the number of terminals is equal to or greater than seven, the measurement packet train is transmitted in the order similar to the above-explained scheme and shown in FIG. 9 to calculate the bidirectional available bandwidth for each communication pathway, and the calculation result is transmitted to the terminal A that is the master terminal.

As explained above, no matter how many the number of the terminals is, the measurement packet train transmitted by each terminal and the measurement packet train received by each terminal do not collide and interfere with each other. Hence, it is possible to precisely measure the bidirectional available bandwidths in all communication pathways among respective terminals. Moreover, the measurement packet train can be simultaneously transmitted from respective terminals in a parallel manner within a range where no collision and interference occur, and thus it is possible to measure a bidirectional available bandwidth within a short time for each communication pathway between respective terminals for an arbitrary number of terminals.

The present invention was explained with reference to the preferred embodiment thereof, but it should be understood that various changes and modifications of the configuration of the above-explained embodiment without departing from the scope and spirit of the present invention are within the scope and spirit of the present invention.

For example, according to the above-explained embodiment, in the process (the available bandwidth collecting process) by the master terminal shown in FIG. 7, transmission of the measurement order information 120 from the master terminal to each slave terminal and transmission of the measurement packet train from the master terminal to each slave terminal are separately performed, but those transmissions may be performed simultaneously (at the same timing). That is, the master terminal may transmit the measurement order information 120 and the measurement packet train to each slave terminal at the same timing. This accomplishes the reduction of time necessary for the measurement. Moreover, a device other than respective terminals may be provided with the measurement order instructing unit (the measurement order instructing means).

It is not always necessary for each terminal to have the available bandwidth calculating unit (the available bandwidth calculating means). In this case, for example, a device other than the terminals may have the available bandwidth calculating unit, necessary information for calculating the available bandwidth may be transmitted to that device from each terminal, and each terminal may receive the calculation result of the available bandwidth transmitted from that device.

Moreover, it is not always necessary to set the measurement order in such a way that the measurement packet train is sequentially transmitted one terminal by one terminal. Furthermore, it is not always necessary to have a setting that satisfies a condition that the plurality of terminals do not transmit the measurement packet train to a terminal simultaneously (at the same timing). For example, when the number of terminals is large (for example, the number of terminals is equal to or greater than four), the number of measurement packet trains simultaneously transmitted by each terminal may be set to be two and the number of measurement packet trains simultaneously received by each terminal may also be set to be two. In this case, in comparison with the technique of transmitting the measurement packet train one by one serially, it is possible to calculate the bidirectional available bandwidth in each communication pathway within a short time. Moreover, in comparison with the technique of transmitting the measurement packet train to all terminals simultaneously in a parallel manner, measurement of the available bandwidth can be performed precisely.

An existing portable information terminal, etc., can function as the terminal device of the present invention by applying a program. That is, the above-explained program for master terminal or the above-explained program for the slave terminal may be installed in an existing portable information terminal, etc., and the CPU, etc., of the portable information terminal, etc., runs such program, thereby causing the portable information terminal, etc., to function as the terminal device of the present invention.

How to distribute such a program is optional, and for example, such a program stored in a computer-readable recording medium, such as a CD-ROM (Compact Disk Read-Only Memory), a DVD (Digital Versatile Disk), an MO (Magneto Optical Disk), or a memory card, may be distributed, or such a program may be distributed over a communication network like the Internet.

This application is based on Japanese Patent Application No. 2009-281291 filed on Dec. 11, 2009, the whole specification, claims and drawings of which are herein incorporated in this specification by reference.

DESCRIPTION OF REFERENCE NUMERALS

101 to 104 Terminals A to D
105 Network
A110 to D110 Measurement order instructing units A to D
A111 to D111 Measurement order interpreting units A to D
A112 to D112 Measurement packet transmitting units A to D
A113 to D113 Available bandwidth calculating units A to D
A114 to D114 Transmitting/receiving units A to D
A115 to D115 Measurement data storing units A to D
120 Measurement order information
121 Instruction receiving terminal ID
122 Measurement receiving terminal ID
130 Measurement result information
131 Measurement transmitting terminal ID
132 Measurement receiving terminal ID
133 Available bandwidth

The invention claimed is:
1. An available bandwidth measuring method comprising:
a step of instructing an order of terminal devices where a measurement packet train is transmitted to each of a plurality of terminal devices connected together via a network;
a step of transmitting the measurement packet train to a destination terminal device that is a destination of the measurement packet train from each of the plurality of terminal devices in accordance with the order; and a step of calculating an available bandwidth in a path from an originator of the measurement packet train to the destination based on a receiving status of the measurement packet train at the destination terminal device, wherein the order is set to satisfy a condition that respective terminal devices do not transmit the measurement packet train to the plurality of terminal devices at a same timing and the plurality of terminal devices do not transmit the measurement packet train to a same terminal device at a same timing.

2. The available bandwidth measuring method according to claim 1, wherein in the step of transmitting the measurement packet train, the plurality of terminal devices transmit the measurement packet train in a parallel manner.

3. The available bandwidth measuring method according to claim 1, wherein in the step of instructing the order, each of the plurality of terminal devices is notified of measurement order information that contains a list of a plurality of identifiers of the terminal devices other than the terminal device arranged in accordance with the order.

4. The available bandwidth measuring method according to claim 3, wherein in the step of transmitting the measurement packet train, each terminal device picks up the identifier of an unprocessed terminal device one by one from a head of the notified measurement order information, and transmits the measurement packet train to the terminal device identified by the picked-up identifier of the terminal device.

5. The available bandwidth measuring method according to claim 3, wherein one of the plurality of terminal devices is a master terminal device and others are slave terminal devices, and in the step of instructing the order, the master terminal device transmits the measurement order information corresponding to respective slave terminal devices to the slave terminal devices.

6. The available bandwidth measuring method according to claim 5, further comprising a step of causing each slave terminal device to transmit the calculated available bandwidth to the master terminal device.

7. The available bandwidth measuring method according to claim 5, wherein the master terminal device transmits the measurement order information and the measurement packet train to the slave terminal device at a same timing.

8. An available bandwidth measuring system comprising a master terminal device and a plurality of slave terminal devices connected together via a network, wherein:

the master terminal device comprises:

a measurement order instructing unit notifying the slave terminal devices of measurement order information that indicates an order of terminal devices each of which is a destination of a measurement packet train to be transmitted;

a first measurement order interpreting unit interpreting the order of transmitting the measurement packet train to a destination terminal device based on the measurement order information set for the master terminal device;

a first measurement packet transmitting unit transmitting the measurement packet train to the destination terminal device in accordance with the order interpreted by the first measurement order interpreting unit; and a first available bandwidth calculating unit calculating, using the measurement packet train received from another terminal device, an available bandwidth in a path from the another terminal device to the master terminal device, the order is set to satisfy a condition that respective terminal devices do not transmit the measurement packet train to the plurality of terminal devices at a same timing and the plurality of terminal devices do not transmit the measurement packet train to a same terminal device at a same timing, and each slave terminal device of the plurality of slave terminal devices comprises:

a second measurement order interpreting unit interpreting the order of transmitting the measurement packet train from the slave terminal device to the destination terminal device based on a measurement order information notified from the master terminal device, a second measurement packet transmitting unit transmitting the measurement packet train to the destination terminal device in accordance with the order interpreted by the second measurement order interpreting unit, and a second available bandwidth calculating unit-calculating, using the measurement packet train received from an other terminal device, an available bandwidth in a path from the other terminal device to the slave terminal device.

9. A terminal device comprising:

a measurement order instructing unit notifying another terminal device connected together via a network of measurement order information indicating an order of terminal devices that are destinations of a measurement packet train to be transmitted;

a measurement order interpreting unit interpreting the order of transmitting the measurement packet train to a destination terminal device based on the measurement order information set for the terminal device;

a measurement packet transmitting unit transmitting the measurement packet train to the destination terminal device in accordance with the order interpreted by the measurement order interpreting unit; and an available bandwidth calculating unit calculating, using the measurement packet train received from an other terminal device, an available bandwidth in a path from the other terminal device to the terminal device, wherein the order is set to satisfy a condition that respective terminal devices do not transmit the measurement packet train to the plurality of terminal devices at a same timing and the plurality of terminal devices do not transmit the measurement packet train to a same terminal device at a same timing.

10. A terminal device comprising:

a measurement order interpreting unit receiving measurement order information indicating an order of terminal devices that are destinations of a measurement packet train to be transmitted, and interpreting the order of transmitting the measurement packet train to a destination terminal device from the terminal device based on the received measurement order information;

a measurement packet transmitting unit transmitting the measurement packet train to the destination terminal device in accordance with the order interpreted by the measurement order interpreting unit; and an available bandwidth calculating unit calculating, using the measurement packet train received from another terminal device, an available bandwidth in a path from the another terminal device to the terminal device, wherein the order is set to satisfy a condition that respective terminal devices do not transmit the measurement packet train to the plurality of terminal devices at a same timing and the plurality of terminal devices do not transmit the measurement packet train to a same terminal device at a same timing.

11. A non-transitory computer-readable recording medium storing therein a program that allows a computer to execute a process of:
- notifying another terminal device connected together via a network of measurement order information indicating an order of terminal devices that are destinations of a measurement packet train to be transmitted;
- interpreting the order of transmitting the measurement packet train to a destination terminal device based on the measurement order information set for a local terminal device;
- transmitting the measurement packet train to the destination terminal device in accordance with the interpreted order; and
- calculating, using the measurement packet train received from an other terminal device, an available bandwidth in a path from the other terminal device to the local terminal device, wherein
- the order is set to satisfy a condition that respective terminal devices do not transmit the measurement packet train to the plurality of terminal devices at a same timing and the plurality of terminal devices do not transmit the measurement packet train to a same terminal device at a same timing.

12. A non-transitory computer-readable recording medium storing therein a program that allows a computer to execute a process of:
- receiving measurement order information indicating an order of terminal devices that are destinations of a measurement packet train to be transmitted, and interpreting the order of transmitting the measurement packet train to a destination terminal device from a local terminal device based on the received measurement order;
- transmitting the measurement packet train to the destination terminal device in accordance with the interpreted order; and
- calculating, using the measurement packet train received from another terminal device, an available bandwidth in a path from the another terminal device to the local terminal device, wherein
- the order is set to satisfy a condition that respective terminal devices do not transmit the measurement packet train to the plurality of terminal devices at a same timing and the plurality of terminal devices do not transmit the measurement packet train to a same terminal device at a same timing.

* * * * *